(12) United States Patent
Koshino et al.

(10) Patent No.: US 12,508,004 B2
(45) Date of Patent: Dec. 30, 2025

(54) ULTRASOUND DIAGNOSTIC APPARATUS AND CONTROL METHOD OF ULTRASOUND DIAGNOSTIC APPARATUS

(71) Applicant: FUJIFILM Corporation, Tokyo (JP)

(72) Inventors: Riko Koshino, Tokyo (JP); Takuya Tsutaoka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 278 days.

(21) Appl. No.: 18/325,495

(22) Filed: May 30, 2023

(65) Prior Publication Data

US 2023/0414204 A1 Dec. 28, 2023

(30) Foreign Application Priority Data

Jun. 22, 2022 (JP) ................................ 2022-100015

(51) Int. Cl.
*A61B 8/00* (2006.01)
*A61B 8/08* (2006.01)
*G06T 7/00* (2017.01)

(52) U.S. Cl.
CPC ................ *A61B 8/54* (2013.01); *A61B 8/085* (2013.01); *A61B 8/463* (2013.01); *G06T 7/0014* (2013.01);
(Continued)

(58) Field of Classification Search
CPC ........... A61B 8/54; A61B 8/085; A61B 8/463; G06T 7/0014; G06T 2207/10132;
(Continued)

(56) References Cited

U.S. PATENT DOCUMENTS 8,582,848 B2 * 11/2013 Funka-Lea ............ G06T 7/0002
382/128
9,589,374 B1 3/2017 Gao et al.
(Continued)

FOREIGN PATENT DOCUMENTS

JP 2007-252763 A 10/2007
JP 2014-100569 A 6/2014
(Continued)

OTHER PUBLICATIONS

The extended European search report issued by the European Patent Office on Oct. 30, 2023, which corresponds to European Patent Application No. 23175669.3-1126 and is related to U.S. Appl. No. 18/325,495.
(Continued)

*Primary Examiner* — Allen H Nguyen
(74) *Attorney, Agent, or Firm* — Studebaker Brackett PLLC

(57) ABSTRACT

There are provided an ultrasound diagnostic apparatus and a control method of the ultrasound diagnostic apparatus which allow a user to accurately perform a diagnosis for a lesion part. The ultrasound diagnostic apparatus includes an image feature calculation unit that calculates a multidimensional image feature in each of a plurality of ultrasound images in which a lesion part of a subject is imaged, by analyzing the plurality of ultrasound images; a score calculation unit that calculates a score of the lesion part in each of the plurality of ultrasound images on the basis of the multidimensional image feature; a determination unit that performs determination on the lesion part on the basis of the score calculated for each of the plurality of ultrasound images; an extraction unit that extracts the ultrasound image best representing a determination result of the determination unit from the plurality of ultrasound images, as a basis image; a monitor; and a display controller that displays the determination
(Continued)

result of the determination unit and the basis image extracted by the extraction unit on the monitor.

10 Claims, 9 Drawing Sheets

(52) U.S. Cl.
CPC ............... *G06T 2207/10132* (2013.01); *G06T 2207/20081* (2013.01); *G06T 2207/30096* (2013.01); *G06T 2210/12* (2013.01)

(58) Field of Classification Search
CPC . G06T 2207/20081; G06T 2207/30096; G06T 2210/12
USPC .......................................................... 382/131
See application file for complete search history.

(56) References Cited

U.S. PATENT DOCUMENTS

| | | | | |
|---|---|---|---|---|
| 10,347,015 | B2* | 7/2019 | Schieke | ................ G06T 11/008 |
| 11,534,142 | B2* | 12/2022 | Watanabe | .............. A61B 8/469 |
| 2004/0193036 | A1 | 9/2004 | Zhou et al. | |
| 2014/0140593 | A1 | 5/2014 | Park et al. | |
| 2017/0024883 | A1 | 1/2017 | Urabe et al. | |
| 2017/0273668 | A1 | 9/2017 | Matsumoto | |
| 2021/0077066 | A1 | 3/2021 | Imai | |
| 2021/0366120 | A1 | 11/2021 | Ito et al. | |
| 2021/0401396 | A1 | 12/2021 | Sato et al. | |
| 2022/0059227 | A1 | 2/2022 | Park et al. | |
| 2022/0401064 | A1 | 12/2022 | Ebata | |
| 2024/0153090 | A1* | 5/2024 | Saikou | ................ G06V 10/764 |

FOREIGN PATENT DOCUMENTS

| | | |
|---|---|---|
| JP | 2017-023347 A | 2/2017 |
| JP | 2017-169793 A | 9/2017 |
| JP | 2019-530488 A | 10/2019 |
| JP | 2021-180730 A | 11/2021 |
| JP | 2021-185970 A | 12/2021 |
| JP | 2022-006990 A | 1/2022 |
| WO | 2021/192824 A1 | 9/2021 |

OTHER PUBLICATIONS

An Office Action; "Notice of Reasons for Refusal," mailed by the Japanese Patent Office on Oct. 21, 2025, which corresponds to Japanese Patent Application No. 2022-100015 and is related to US. Appl. No. 18/325,495; with English language translation.

* cited by examiner

FIG. 8

| A1 ↘ | | | | |
|---|---|---|---|---|
| SHAPE | ☐ CIRCULAR SHAPE | ☐ OVAL SHAPE | ☐ POLYGONAL SHAPE | ☐ LOBULATED SHAPE | ■ IRREGULAR SHAPE |
| BORDER LINE | ☐ SMOOTH | ☐ ROUGH | ■ UNCLEAR | | |
| INTERNAL ECHO | LEVEL | ○ NONE | ○ EXTREMELY LOW | ○ LOW | ● EQUAL | ○ HIGH |
| | HOMOGENEITY | ○ HOMOGENEOUS | ● HETEROGENEOUS | | |
| halo | ● + | ○ - | BORDER LINE RUPTURE | ● + | ○ - |
| POSTERIOR ECHO | ☐ ENHANCEMENT | ☐ NO CHANGE | ■ ATTENUATION | ☐ DISAPPEARANCE | |
| ASPECT RATIO | ○ LARGE | ● SMALL | CALCIFICATION | ○ FINE | ○ ROUGH |

FINDING FEATURE

ESTIMATED TISSUE TYPE

MALIGNANCY GRADE    ○○%

CATEGORY

ULTRASOUND DIAGNOSTIC APPARATUS AND CONTROL METHOD OF ULTRASOUND DIAGNOSTIC APPARATUS

CROSS-REFERENCE TO RELATED APPLICATIONS

The present application claims priority under 35 U.S.C. § 119 to Japanese Patent Application No. 2022-100015, filed on Jun. 22, 2022. The above application is hereby expressly incorporated by reference, in its entirety, into the present application.

BACKGROUND OF THE INVENTION

1. Field of the Invention

The present invention relates to an ultrasound diagnostic apparatus, and a control method of the ultrasound diagnostic apparatus which perform determination on a lesion part.

2. Description of the Related Art

In the related art, in the medical field, an ultrasound diagnostic apparatus using an ultrasound image has been put to practical use. In general, an ultrasound diagnostic apparatus includes an ultrasound probe with a built-in transducer array, and an apparatus main body connected to the ultrasound probe, and the ultrasound diagnostic apparatus causes the ultrasound probe to transmit an ultrasound beam toward a subject, receives an ultrasound echo from the subject by the ultrasound probe, and electrically processes a reception signal thereof to generate an ultrasound image.

For example, a user such as a doctor performs a diagnosis for the lesion part of the subject by checking the ultrasound image generated in this manner. In this case, the user normally selects an appropriate ultrasound image for the diagnosis by checking a plurality of ultrasound images captured in the ultrasonography. In order to reduce the user's labor for selecting the ultrasound image in this manner, a technique disclosed in JP2007-252763A has been developed.

JP2007-252763A discloses a device that automatically analyzes the ultrasound images to detect candidates for the lesion part, and reduces the number of ultrasound images by merging a series of ultrasound images, from which the candidate for the lesion part has not been detected, by image processing. The user can select an appropriate ultrasound image for the diagnosis by checking a plurality of ultrasound images from which the candidate for the lesion part has been detected and which have remained after merging.

SUMMARY OF THE INVENTION

However, even in a case where the device as in JP2007-252763A has detected the candidate for the lesion part automatically, the user may not trust the detection result and may select an ultrasound image that is not appropriate for the diagnosis, such as an image in which features such as the shape of the lesion part are not shown, for example. As a result, there is a risk that the diagnostic accuracy of the lesion will be lowered.

The present invention has been made in order to solve such a problem in the related art, and an object of the invention is to provide an ultrasound diagnostic apparatus and a control method of the ultrasound diagnostic apparatus which allow a user to accurately perform a diagnosis for a lesion part.

The above object can be achieved by the following configuration.

[1] An ultrasound diagnostic apparatus that performs determination on a lesion part of a subject on the basis of a plurality of ultrasound images in which the lesion part is imaged, the ultrasound diagnostic apparatus comprising:
an image feature calculation unit that calculates a multi-dimensional image feature in each of the plurality of ultrasound images by analyzing the plurality of ultrasound images;
a score calculation unit that calculates a score of the lesion part in each of the plurality of ultrasound images on the basis of the multidimensional image feature;
a determination unit that performs determination on the lesion part on the basis of the score calculated for each of the plurality of ultrasound images;
an extraction unit that extracts the ultrasound image best representing a determination result of the determination unit from the plurality of ultrasound images, as a basis image;
a monitor; and
a display controller that displays the determination result of the determination unit and the basis image extracted by the extraction unit on the monitor.

[2] The ultrasound diagnostic apparatus described in [1], in which the plurality of ultrasound images are images forming a video in which the lesion part is imaged.

[3] The ultrasound diagnostic apparatus described in [1] or [2], in which each of the plurality of ultrasound images is an image in which an entire or a part of the lesion part is imaged.

[4] The ultrasound diagnostic apparatus described in [2], in which the plurality of ultrasound images are a thinned-out image, an interpolated image, or a synthesized image from the images forming the video in which the lesion part is imaged.

[5] The ultrasound diagnostic apparatus described in any one of [1] to [4], in which the extraction unit forms an enclosing line surrounding the lesion part on the basis image, and the display controller superimposes and displays the enclosing line on the basis image.

[6] The ultrasound diagnostic apparatus described in any one of [1] to [4], in which the extraction unit forms a heat map in which a contribution rate of a portion contributing to calculation of the score by the score calculation unit is represented by color shading or color difference, in the basis image, and the display controller displays the heat map on the monitor.

[7] The ultrasound diagnostic apparatus described in any one of [1] to [6], in which the score calculation unit calculates the score by a machine learning model trained for the multidimensional image feature of the ultrasound image.

[8] The ultrasound diagnostic apparatus described in any one of [1] to [7], in which the determination unit performs determination on the basis of the score of the ultrasound image in which the imaged lesion part is the largest among the plurality of ultrasound images.

[9] The ultrasound diagnostic apparatus described in any one of [1] to [7], in which the determination unit performs determination on the basis of the majority, the maximum value, the median, or the mode of the scores of the plurality of ultrasound images.

[10] The ultrasound diagnostic apparatus described in any one of [1] to [7], in which the determination unit excludes outliers from the scores of the plurality of ultrasound images, and performs determination on the basis of the majority, the maximum value, the median, or the mode of the scores of the plurality of ultrasound images from which the outliers have been excluded.

[11] A control method of an ultrasound diagnostic apparatus that performs determination on a lesion part of a subject on the basis of a plurality of ultrasound images in which the lesion part is imaged, the control method comprising:

calculating a multidimensional image feature in each of the plurality of ultrasound images by analyzing the plurality of ultrasound images;

calculating a score of the lesion part in each of the plurality of ultrasound images on the basis of the multidimensional image feature;

performing determination on the lesion part on the basis of the score calculated for each of the plurality of ultrasound images;

extracting the ultrasound image best representing a determination result for the lesion part from the plurality of ultrasound images, as a basis image; and displaying the determination result and the basis image on a monitor.

According to the present invention, the ultrasound diagnostic apparatus includes an image feature calculation unit that calculates a multidimensional image feature in each of a plurality of ultrasound images by analyzing the plurality of ultrasound images; a score calculation unit that calculates a score of the lesion part in each of the plurality of ultrasound images on the basis of the multidimensional image feature; a determination unit that performs determination on the lesion part on the basis of the score calculated for each of the plurality of ultrasound images; an extraction unit that extracts the ultrasound image best representing a determination result of the determination unit from the plurality of ultrasound images, as a basis image; a monitor; and a display controller that displays the determination result of the determination unit and the basis image extracted by the extraction unit on the monitor. Therefore, it is possible for the user to accurately perform the diagnosis for the lesion part.

BRIEF DESCRIPTION OF THE DRAWINGS

FIG. 8 is a diagram illustrating a display example of a determination result regarding a lesion part.

DESCRIPTION OF THE PREFERRED EMBODIMENTS

Hereinafter, embodiments of the invention will be described with reference to the accompanying drawings.

The description of configuration requirements described below is given on the basis of the representative embodiment of the present invention, but the present invention is not limited to such an embodiment.

In the present specification, a numerical range represented using "to" means a range including the numerical values before and after "to" as a lower limit value and an upper limit value.

In the present specification, the terms "same" and "identical" include an error range generally allowed in the technical field.

First Embodiment

Figure 1:
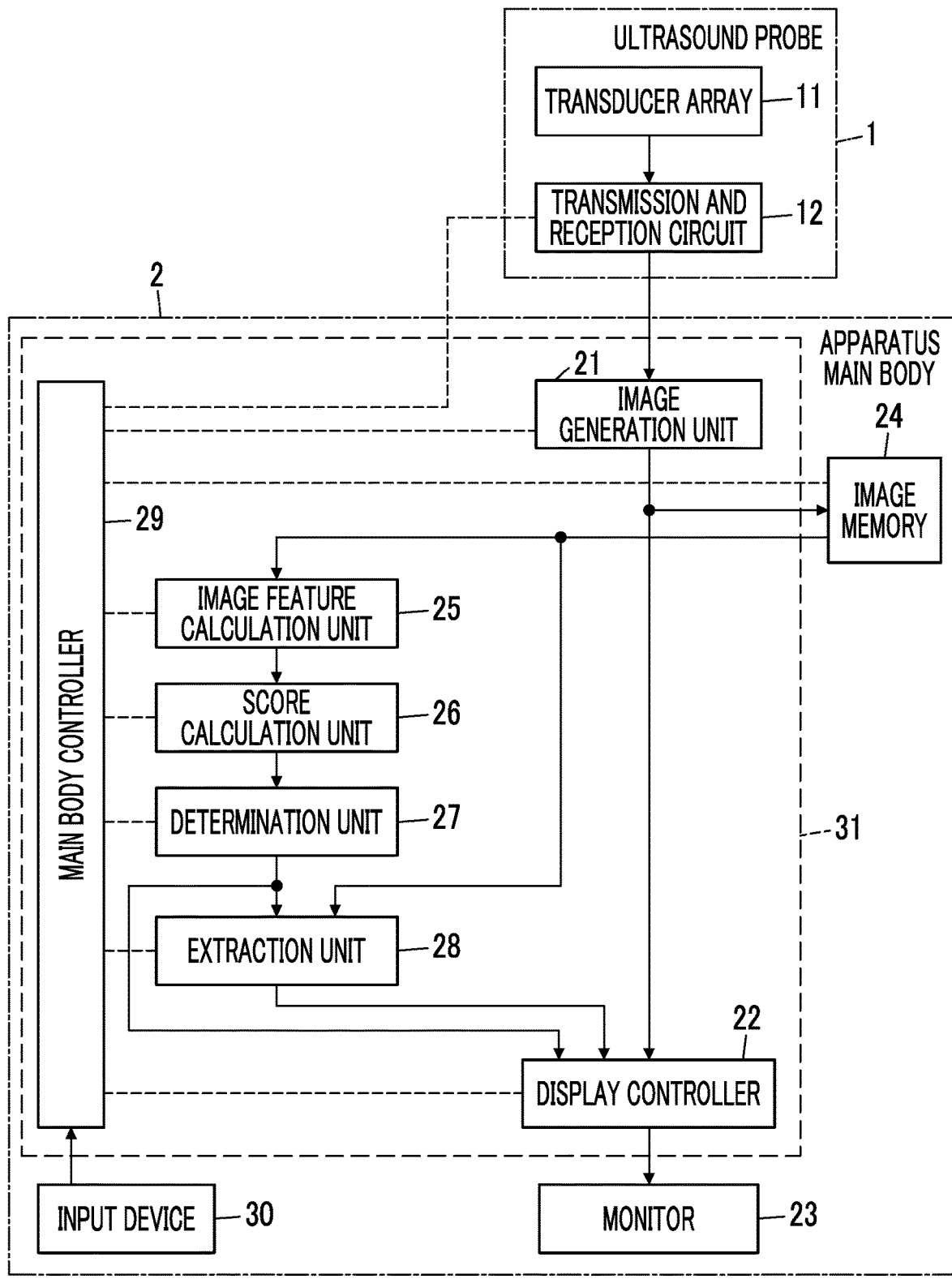
FIG. 1 is a block diagram illustrating a configuration of an ultrasound diagnostic apparatus according to a first embodiment of the present invention.

FIG. 1 illustrates a configuration of an ultrasound diagnostic apparatus according to a first embodiment of the present invention. The ultrasound diagnostic apparatus includes an ultrasound probe 1 and an apparatus main body 2. The ultrasound probe 1 and the apparatus main body 2 are connected to each other in a wired manner via a cable (not illustrated).

The ultrasound probe 1 includes a transducer array 11, and a transmission and reception circuit 12 is connected to the transducer array 11.

The apparatus main body 2 has an image generation unit 21 connected to the transmission and reception circuit 12 of the ultrasound probe 1, a display controller 22 and a monitor 23 are sequentially connected to the image generation unit 21, and an image memory 24 is connected to the image generation unit 21. An image feature calculation unit 25, a score calculation unit 26, a determination unit 27, and an extraction unit 28 are sequentially connected to the image memory 24. The determination unit 27 is connected to the display controller 22. The extraction unit 28 is connected to the display controller 22 and the image memory 24. In addition, a main body controller 29 is connected to the transmission and reception circuit 12, the image generation unit 21, the display controller 22, the image memory 24, the image feature calculation unit 25, the score calculation unit 26, the determination unit 27, and the extraction unit 28. An input device 30 is connected to the main body controller 29.

Further, the image generation unit 21, the display controller 22, the image feature calculation unit 25, the score calculation unit 26, the determination unit 27, the extraction unit 28, and the main body controller 29 constitute a processor 31 for the apparatus main body 2.

The transducer array 11 of the ultrasound probe 1 has a plurality of ultrasonic transducers arranged in a one-dimensional or two-dimensional manner. According to a drive signal supplied from the transmission and reception circuit 12, each of the transducers transmits an ultrasonic wave and receives a reflected wave from the subject to output an analog reception signal. For example, each transducer is configured by forming electrodes at both ends of a piezoelectric body consisting of piezoelectric ceramic represented by lead zirconate titanate (PZT), a polymer piezoelectric element represented by poly vinylidene di fluoride (PVDF), piezoelectric single crystal represented by lead magnesium niobate-lead titanate (PMN-PT), or the like.

Figure 2:
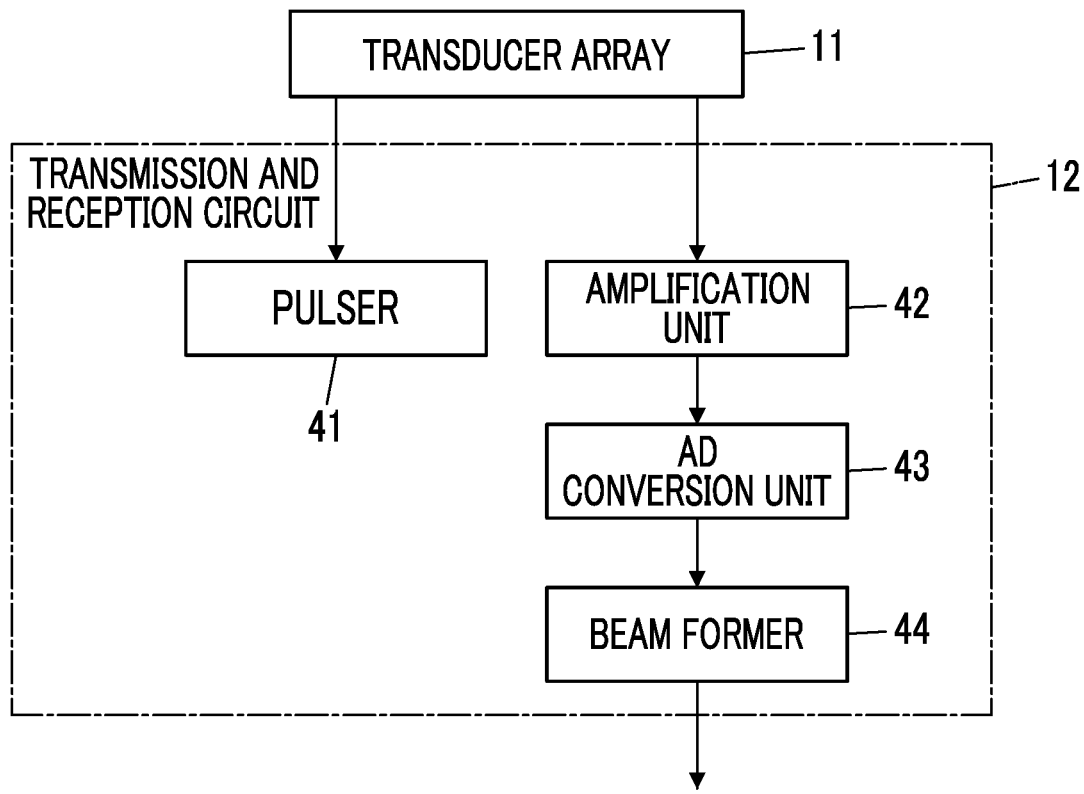
FIG. 2 is a block diagram illustrating an internal configuration of a transmission and reception circuit in the first embodiment.

The transmission and reception circuit 12 causes the transducer array 11 to transmit the ultrasonic wave and generates a sound ray signal on the basis of a reception signal acquired by the transducer array 11, under the control of the main body controller 29. As illustrated in FIG. 2, the transmission and reception circuit 12 has a pulser 41 connected to the transducer array 11, and an amplification unit 42, an analog digital (AD) conversion unit 43, and a beam former 44 that are sequentially connected in series to the transducer array 11.

The pulser 41 includes, for example, a plurality of pulse generators, and the pulser 41 adjusts the amount of delay of each drive signal so that ultrasonic waves transmitted from the plurality of transducers of the transducer array 11 form an ultrasound beam on the basis of a transmission delay pattern selected according to the control signal from the main body controller 29, and supplies the obtained signals to the plurality of transducers. Thus, in a case where a pulsed or continuous-wave voltage is applied to the electrodes of the transducers of the transducer array 11, the piezoelectric body expands and contracts to generate pulsed or continuous-wave ultrasonic waves from each transducer. From the combined wave of these ultrasonic waves, an ultrasound beam is formed.

The transmitted ultrasound beam is reflected by a target, for example, a site of the subject, and the ultrasound echo propagates toward the transducer array 11 of the ultrasound probe 1. The ultrasound echo propagating toward the transducer array 11 in this manner is received by each transducer constituting the transducer array 11. In this case, each transducer constituting the transducer array 11 expands and contracts by receiving the propagating ultrasound echo to generate a reception signal that is an electric signal, and outputs the reception signal to the amplification unit 42.

The amplification unit 42 amplifies the signals input from each transducer constituting the transducer array 11, and transmits the amplified signals to the AD conversion unit 43. The AD conversion unit 43 converts the signal transmitted from the amplification unit 42 into digital reception data, and transmits the reception data to the beam former 44. The beam former 44 performs so-called reception focusing processing in which addition is performed by giving delays to respective pieces of the reception data converted by the AD conversion unit 43 according to a sound speed distribution or a sound speed set on the basis of a reception delay pattern selected according to the control signal from the main body controller 29. Through the reception focusing processing, a sound ray signal in which each piece of the reception data converted by the AD conversion unit 43 is phased and added and the focus of the ultrasound echo is narrowed is acquired.

Figure 3:
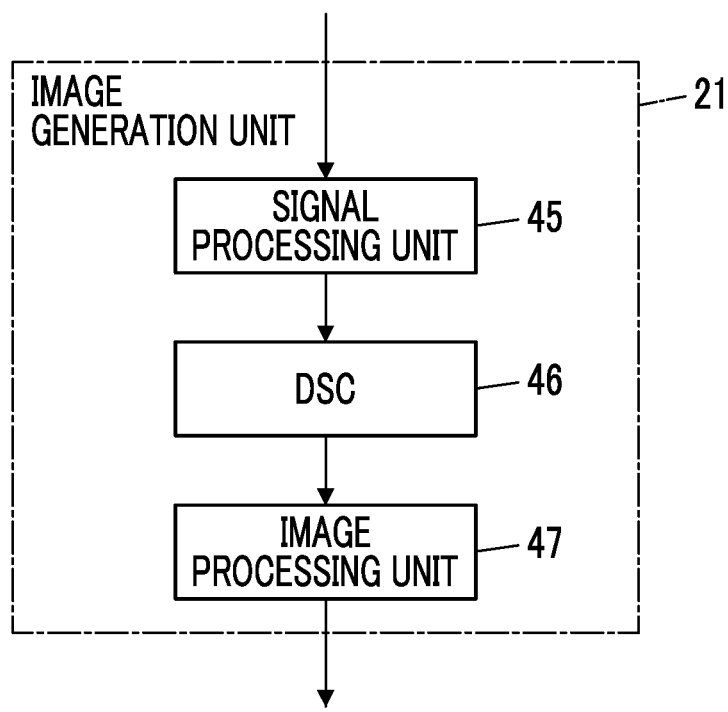
FIG. 3 is a block diagram illustrating an internal configuration of an image generation unit in the first embodiment.

As illustrated in FIG. 3, the image generation unit 21 of the apparatus main body 2 has a configuration in which a signal processing unit 45, a digital scan converter (DSC) 46, and an image processing unit 47 are sequentially connected in series.

The signal processing unit 45 generates an ultrasound image signal (B-mode image signal), which is tomographic image information regarding tissues inside the subject, by performing, on the sound ray signal sent from the transmission and reception circuit 12 of the ultrasound probe 1, correction of the attenuation due to the distance according to the depth of the reflection position of the ultrasonic wave and then performing envelope detection processing.

The DSC 46 converts (raster conversion) the ultrasound image signal generated by the signal processing unit 45 into an image signal according to a normal television signal scanning method.

The image processing unit 47 performs various kinds of necessary image processing such as gradation processing on the ultrasound image signal input from the DSC 46, and then outputs the signal representing the ultrasound image to the display controller 22 and the image memory 24. The signal representing the ultrasound image generated by the image generation unit 21 in this manner is simply referred to as an ultrasound image.

The image memory 24 is a memory that stores the ultrasound image generated by the image generation unit 21 under the control of the main body controller 29. For example, the image memory 24 can store a plurality of ultrasound images constituting a video, which are generated by consecutively imaging a region including the same lesion part of the subject by the image generation unit 21. Each of the plurality of ultrasound images may be an image in which the entire lesion part is imaged or an image in which a part of the lesion part is imaged.

Here, as the image memory 24, recording media such as a flash memory, a hard disc drive (HDD), a solid state drive (SSD), a flexible disc (FD), a magneto-optical disc (MO disc), a magnetic tape (MT), a random access memory (RAM), a compact disc (CD), a digital versatile disc (DVD), a secure digital card (SD card), and a universal serial bus memory (USB memory), or the like can be used.

The image feature calculation unit 25 calculates multidimensional image features in each of the plurality of ultrasound images by analyzing the plurality of ultrasound images which are stored in the image memory 24 and in which the lesion part of the subject is imaged. For example, the image feature calculation unit 25 can calculate, as the multidimensional image feature, intermediate numerical data that is output for each of a plurality of ultrasound images as a result of inputting the plurality of ultrasound images to an image recognition model such as a so-called neural network in machine learning. The intermediate numerical data is generally called a feature amount in the field of machine learning.

Further, for example, the image feature calculation unit 25 can calculate an area ratio of a low brightness region with brightness lower than predetermined brightness to the entire region of the ultrasound image, a contrast ratio between an edge of the low brightness region and the surrounding region, and the like as the multidimensional image feature. The image feature calculation unit 25 can calculate the area ratio of the low brightness region to the entire region of the ultrasound image and the contrast ratio between the edge of the low brightness region and the surrounding region by using the image recognition model, or can calculate the ratios by using a well-known image analysis method without using the image recognition model.

The score calculation unit 26 calculates the score of the lesion part in each of the plurality of ultrasound images on the basis of the multidimensional image feature calculated by the image feature calculation unit 25. For example, the score calculation unit 26 can calculate the score of the lesion part from the multidimensional image feature by using a machine learning model (for example, a neural network and a deep learning model) that is trained in advance for a relationship between a large number of multidimensional image features obtained from a large number of typical ultrasound images in which a large number of lesion parts are imaged, and information regarding the lesion part such as pathological findings, the shape, and diagnostic findings regarding the lesion part thereof, as teacher data.

The score calculation unit 26 can calculate a plurality of types of scores such as a benignancy or malignancy score, a category score, a shape score, a border score, a halo score, a border line rupture score, and a mammary gland site score. The benignancy or malignancy score is a score (benignancy score) representing a benignancy grade or a score (malignancy score) representing a malignancy grade of the lesion part of the subject imaged in the ultrasound image.

The category score is a score representing a so-called medical examination or diagnosis categories of the lesion part determined by the Japanese Association of Breast and Thyroid Sonology (JABTS) or the American College of Radiology (ACR). For example, JABTS defines medical examination categories 1 to 5 as follows.

Medical examination category 1: no abnormal findings

Figure 4:
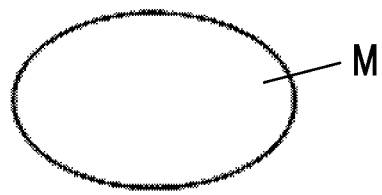
FIG. 4 is a diagram schematically illustrating a lesion part having an oval shape.
Figure 5:
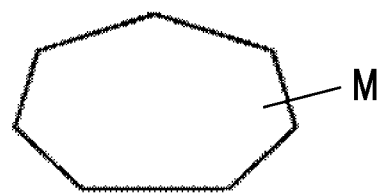
FIG. 5 is a diagram schematically illustrating a lesion part having a polygonal shape.
Figure 6:
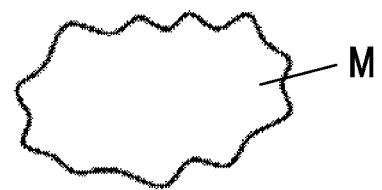
FIG. 6 is a diagram schematically illustrating a lesion part having a lobulated shape.
Figure 7:
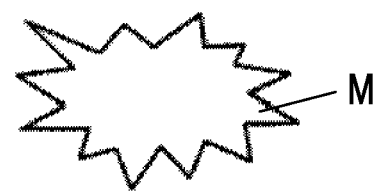
FIG. 7 is a diagram schematically illustrating a lesion part having an irregular shape.

Medical examination category 2: there are findings but detailed examination is not required Medical examination category 3: benign but malignancy cannot be ruled out Medical examination category 4: suspicious of malignancy Medical examination category 5: malignant The shape score is a score regarding the shape of the lesion part. For example, the shape score has a greater value as the shape of the lesion part has a "narrow part" and an "angulated part". Here, in general, the shape of a lesion part M is classified into, for example, a circular shape or oval shape (without narrow part, without angulated part) as illustrated in FIG. 4, a polygonal shape (without narrow part, with angulated part) as illustrated in FIG. 5, a lobulated shape (with narrow part, without angulated part) as illustrated in FIG. 6, and an irregular shape (with narrow part, with angulated part) as illustrated in FIG. 7, according to whether or not the shape including the border hyperechoic portion in the ultrasound image has a "narrow part" and an "angulated part".

For example, the score calculation unit 26 can calculate the number of narrow parts in the lesion part M as the score.

The border score is a score regarding the smoothness of the border portion of the lesion part M, and for example, the border score is larger as the border portion is rougher, and is lower as the border portion is smoother.

The halo score is a score representing whether or not there is a so-called halo as a hyperechoic band in the border portion of the lesion part M. For example, as the halo score, any one of a "+" score indicating that there is a halo and a "−" score indicating that there is no halo is output.

The border line rupture score is a score indicating whether or not the border line between the mammary gland and the peripheral tissue thereof is ruptured due to the lesion part M. For example, the score calculation unit 26 can extract the border line of the tissue in a certain periphery of the lesion part M, and determine whether the extracted border line is ruptured due to the border portion of the lesion part M. As an example of the border line rupture score, any one of a "+" score indicating that the border line is ruptured and a "−" score indicating that the border line is not ruptured is output.

The mammary gland site score is a score indicating where the lesion part M is positioned in the mammary gland. For example, the mammary gland site score can represent whether the lesion part M is positioned on the breast duct side or positioned on the lobule side in the mammary gland with the score value.

The determination unit 27 performs the determination on the lesion part M on the basis of the score calculated by the score calculation unit 26 for the plurality of ultrasound images. For example, the determination unit 27 can determine whether the shape of the lesion part M is a circular shape, an oval shape, a polygonal shape, a lobulated shape, or an irregular shape, on the basis of the shape score calculated by the score calculation unit 26. Further, for example, the determination unit 27 can determine whether the border portion of the lesion part M is smooth, rough, or unclear in the ultrasound image on the basis of the border score calculated by the score calculation unit 26.

For example, the determination unit 27 can determine the tissue type of the lesion part M on the basis of the halo score, the border line rupture score, and the mammary gland site score calculated by the score calculation unit 26. For example, it is known that the lesion part occurring in the breast is classified into a plurality of tissue types such as ductal carcinoma in situ (DCIS), invasive ductal carcinoma (IDC), and invasive lobular carcinoma (ILC). For example, the determination unit 27 can determine whether the lesion part M is an invasive type or a non-invasive type on the basis of the halo score and the border line rupture score, determine whether the lesion part M is positioned on the breast duct side or positioned on the lobule side on the basis of the mammary gland site score, and finally determine the tissue type of the lesion part M by combining the determination results.

Here, the determination unit 27 can perform the determination on the basis of the scores of the ultrasound image in which the imaged lesion part M is the largest, among the plurality of ultrasound images. In this case, the determination unit 27 can calculate the maximum diameter of the lesion part M in the plurality of ultrasound images by performing the image analysis on the plurality of ultrasound images, and specify the ultrasound image in which the imaged lesion part M is the largest on the basis of the calculated value of the maximum diameter.

The determination unit 27 can perform the determination on the basis of the majority of the scores of the plurality of ultrasound images, for example, the shape score having the most calculated value among the plurality of shape scores, and the border score having the most calculated value among the plurality of border scores, for each of the plurality of type of scores.

The determination unit 27 can perform the determination on the basis of the maximum value of the scores of the plurality of ultrasound images, for example, the maximum shape score among the plurality of shape scores, and the maximum border score among the plurality of border scores, for each of the plurality of type of scores.

The determination unit 27 can perform the determination on the basis of the median of the scores of the plurality of ultrasound images, for example, the shape score as the median of the plurality of shape scores, or the mode thereof, for example, the value obtained most frequently among the plurality of shape scores, for each of the plurality of type of scores.

The determination unit 27 can exclude outliers from each of the plurality of types of scores, and perform the determination on the basis of the majority, the maximum value, the median, or the mode of the plurality of scores from which the outliers have been excluded. For example, the determination unit 27 can have a predetermined threshold value for the score, and exclude the scores exceeding the threshold value as the outliers.

Further, the determination unit 27 specifies the score corresponding to the determination result, and outputs the information on the ultrasound image for which the score has been calculated, to the extraction unit 28. For example, in a case where it is determined that the border portion of the lesion part M in the ultrasound image is rough, the determination unit 27 specifies a border score determined to be rough from a plurality of border scores, and can output the Information on the ultrasound image for which the border score has been calculated, to the extraction unit 28.

Further, the determination unit 27 can output a representative value of the score that can be easily understood by the user, such as the benignancy or malignancy score of the lesion part M, the category score of the lesion part M, and the number of narrow parts in the lesion part M, among the scores calculated by the score calculation unit 26, to the display controller 22. In this case, for example, similar to the case of performing the determination on the lesion part M, the determination unit 27 can output the score of the ultrasound image in which the imaged lesion part M is the largest, the majority of the scores of the plurality of ultrasound images, or the maximum value of the scores of the plurality of ultrasound images, as the representative value.

The determination unit 27 sends the determination result regarding the lesion part M to the display controller 22.

The extraction unit 28 receives the determination result regarding the lesion part M from the determination unit 27, and extracts at least one ultrasound image best representing the determination result of the determination unit 27, from among the plurality of ultrasound images stored in the image memory 24, as a basis image. For example, in a case where it is determined that the border portion of the lesion part M in the ultrasound image is rough by the determination unit 27, the extraction unit 28 can extract the ultrasound image having the maximum border score among at least one border score determined to be rough, sent from the determination unit 27, as the basis image for determining that the border portion of the lesion part M is rough.

Further, for example, in a case where it is determined that the border portion of the lesion part M in the ultrasound image is rough by the determination unit 27, the extraction unit 28 can select all the ultrasound images having the border score higher than a predetermined border score threshold value, calculate a similarity degree between the selected ultrasound images, group the plurality of ultrasound images of which the calculated similarity degree is lower than a certain value, that is, the plurality of ultrasound images similar to each other, and extract the ultrasound image of which the border score is the maximum value or the median in each group, as the basis image. For example, in a case where a plurality of groups of the ultrasound images similar to each other are created, the extraction unit 28 can extract a plurality of basis images.

The display controller 22 performs predetermined processing on the ultrasound image generated by the image generation unit 21, the representative value of the scores output by the determination unit 27, the determination result of the determination unit 27, and at least one basis image U extracted by the extraction unit 28, and displays the processed result on the monitor 23.

The display controller 22 can display, as the determination result of the determination unit 27, a finding feature A1 as illustrated in FIG. 8 on the monitor 23, for example. In the example of FIG. 8, the finding feature A1 includes items of "shape", "border line", "internal echo", "halo", "border line rupture", "posterior echo", "aspect ratio", and "calcification".

The item of "shape" indicates that the shape of the lesion part M is any one of a circular shape, an oval shape, a polygonal shape, a lobulated shape, and an irregular shape. The item of "border line" indicates that the border portion of the lesion part M is any one of smooth, rough, and unclear. The item of "internal echo" is divided into items of "level" and "homogeneity". The item of "level" indicates the echo level representing the brightness in the lesion part M in the ultrasound image is any of "none", "extremely low", "low", "equal" and "high". The closer the echo level is to "none", the lower the brightness in the lesion part M in the ultrasound image, and the closer the echo level is to "high", the higher the brightness in the lesion part M in the ultrasound image. The item of "homogeneity" indicates whether the lesion part M in the ultrasound image is homogeneous or heterogeneous.

The item of "halo" indicates whether or not there is a halo as a hyperechoic band in the border portion of the lesion part M. A state where there is a halo is indicated by "+", and a state where there is no halo is indicated by "−". The item of "border line rupture" indicates whether or not the border portion of the lesion part M is ruptured. A state where the border portion is ruptured is indicated by "+", and a state where the border portion is not ruptured is indicated by "−".

The item of "posterior echo" indicates whether the echo level of a region in a deep portion of the lesion part M is enhanced, is unchanged, is attenuated, or disappears compared to the echo level in a region in a shallow portion of the lesion part M. The item of "aspect ratio" indicates the dimension of the lesion part M in the depth direction in the ultrasound image is larger or smaller than the dimension of the lesion part M in a direction orthogonal to the depth direction. The item of "calcification" indicates whether the degree of calcification is fine or rough in a case where the lesion part M has a calcified portion.

In the example illustrated in FIG. 8, the finding feature A1 indicates that the "shape" is an irregular shape, the "border line" is unclear, the "level" of the "internal echo" is equal level, the "homogeneity" is heterogeneous, the "halo" is "+" (present), the "border line rupture" is "+" (the border portion is ruptured), the "posterior echo" is attenuated, the "aspect ratio" is small, and there is no "calcification".

Figure 9:
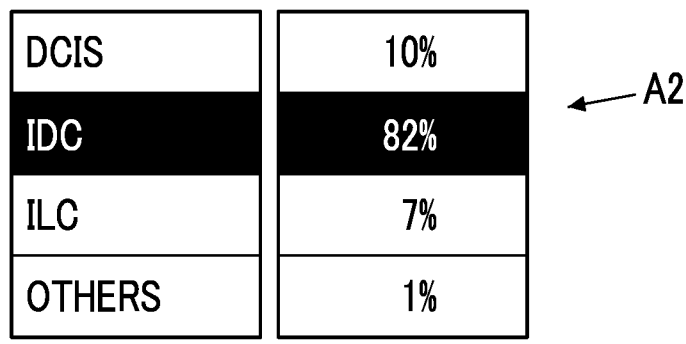
FIG. 9 is a diagram illustrating another display example of a determination result regarding a lesion part.

Further, the display controller 22 can display, as the determination result of the determination unit 27, an estimated tissue type A2 as illustrated in FIG. 9 on the monitor 23, for example. In the example of FIG. 9, the estimated tissue type A2 indicates items of "DCIS", "IDC", "ILC", and "the others", and the probability that the lesion part M imaged in the plurality of ultrasound images has a tissue type corresponding to the items of "DCIS", "IDC", "ILC", and "the others".

Figure 10:
FIG. 10 is a diagram illustrating a display example of scores regarding a malignancy grade of a lesion part.

Further, the display controller 22 can display, as the representative value of the scores output by the determination unit 27, a malignancy grade A3 as illustrated in FIG. 10 on the monitor 23, for example. In the example of FIG. 10, the display of the malignancy grade A3 includes a numerical value (oo %) representing the malignancy grade of the lesion part M, and a meter visually representing the numerical value.

Figure 11:
FIG. 11 is a diagram illustrating a display example of scores regarding a category of a lesion part.

The display controller 22 can display, as the representative value of the scores output by the determination unit 27, a medical examination category A4 as illustrated in FIG. 11 on the monitor 23, for example. In the example of FIG. 11, the display of the medical examination category A4 indicates which of the medical examination categories 1 to 5 the lesion part M belongs to. FIG. 11 illustrates that the medical examination category of the lesion part M is 4.

Figure 12:
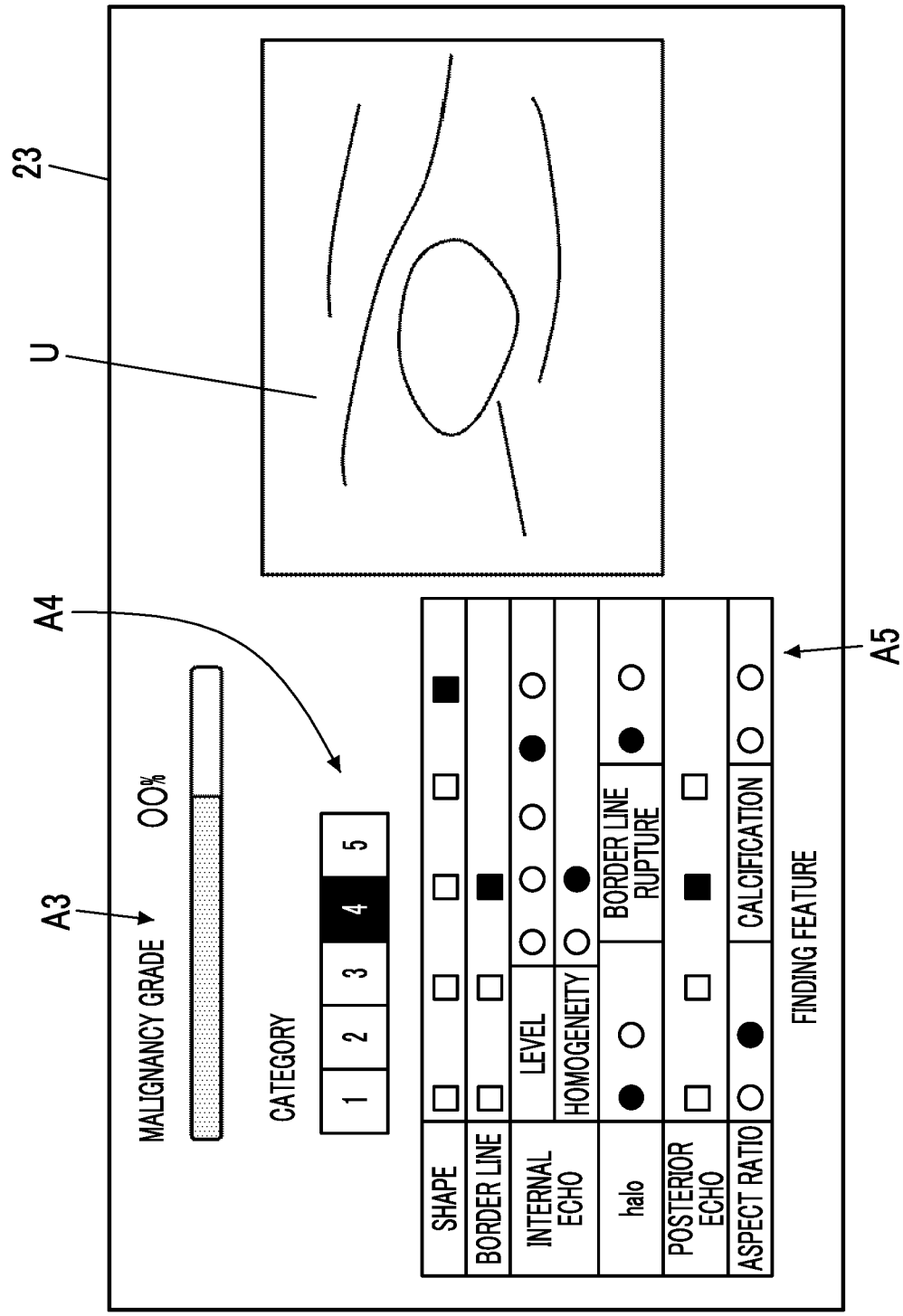
FIG. 12 is a diagram illustrating an example of a basis image displayed on a monitor.

Here, for example, in a case where any one of the determination results of the determination unit 27 displayed on the monitor 23 is selected by the user via the input device 30, the display controller 22 displays the basis image U that best represents the selected determination result and is extracted by the extraction unit 28, on the monitor 23 as illustrated in FIG. 12.

For example, in a case where it is determined that the border portion of the lesion part M is unclear by the determination unit 27, in a case where the region of "unclear" of the item of "border line" in the finding feature A1 is selected by the user, the display controller 22 can display at least one basis image U, which is extracted by the extraction unit 28 and best represents that the border portion of the lesion part M is unclear, on the monitor 23.

In a case where a plurality of basis images U that best represent the determination result of the determination unit 27 are displayed on the monitor 23, the display controller 22 can perform so-called scroll display of the plurality of basis images U, and can also sequentially switch and display the plurality of basis images U according to the user's instruction via the input device 30. In this case, the display controller 22 can sequentially assign numbers to the basis images U in an order from the oldest basis image U generated in the past to the most recently generated basis image U, and display the basis images U and the numbers together. The user can distinguish and recognize the plurality of ultrasound images from each other by checking the numbers.

Since the determination result of the determination unit 27 and the basis image U corresponding to the determination result are displayed together, the user can understand the basis for the determination result by checking the basis image U, and therefore, it is possible to easily and accurately select an appropriate ultrasound image for the diagnosis for the subject, and to accurately perform the diagnosis for the subject.

Figure 13:
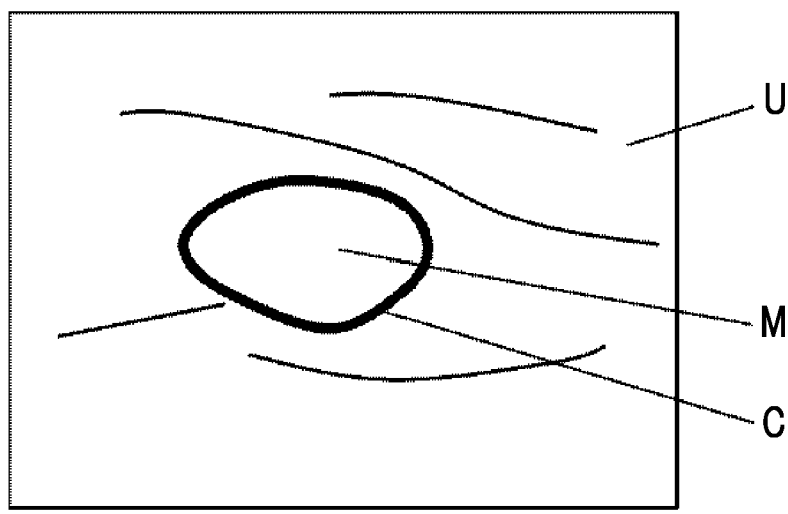
FIG. 13 is a diagram illustrating an example of an ultrasound image in which a lesion part is displayed in an emphasized manner.

Further, as illustrated in FIG. 13, the extraction unit 28 can perform the image analysis on the basis image U to detect the lesion part M, and form an enclosing line L surrounding the detected lesion part M. In this case, the display controller 22 can superimpose and display the enclosing line L formed by the extraction unit 28 on the basis image U. In this case, the display controller 22 can also color the inner portion of the enclosing line L. By displaying the lesion part M in the basis image U in an emphasized manner in this way, it is possible for the user to easily understand the position and shape of the lesion part M in the basis image U.

Figure 14:
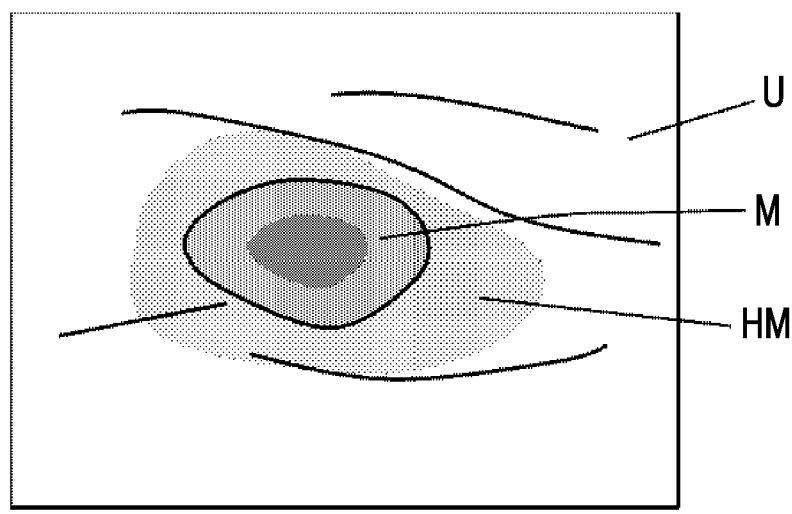
FIG. 14 is a diagram illustrating an example of an ultrasound image superimposed with a heat map regarding scores of a lesion part.

As illustrated in FIG. 14, the extraction unit 28 can form a heat map HM in which a contribution rate of the portion contributing to the calculation of the scores by the score calculation unit 26 is represented by color shading or color difference, in the basis image U. The portion contributing to the calculation of the scores is a region focused on the calculation of the scores. For example, in a case where the shape score or the border score is calculated, in a case where it is determined that the portion contributing to the determination in the border portion and/or a region near the border portion of the lesion part M, for example, the border portion is unclear, the unclear portion in the border portion is displayed in an emphasized manner.

Further, for example, in a case where the score regarding the homogeneity is calculated for the internal echo of the lesion part M, the portion contributing to the determination in the inside of the lesion part M, for example, the heterogeneous portion is displayed in an emphasized manner. By checking the heat map HM, it is possible for the user to understand the region on the basis image U relating to the score, and to understand the basis for the determination result of the determination unit 27 in more detail.

The monitor 23 is for displaying the ultrasound image generated by the image generation unit 21, the representative value of the scores output by the determination unit 27, the determination result of the determination unit 27, at least one basis image U extracted by the extraction unit 28, and the like under the control of the display controller 22, and includes a display device such as a liquid crystal display (LCD), or an organic electroluminescence (EL) display.

The main body controller 29 controls each unit of the apparatus main body 2 and the transmission and reception circuit 12 of the ultrasound probe 1 on the basis of a control program and the like stored in advance.

The input device 30 is for a user to perform an input operation, and is configured by, for example, a device such as a keyboard, a mouse, a trackball, a touchpad, and a touch sensor superimposed on the monitor 23.

The processor 31 having the image generation unit 21, the display controller 22, the image feature calculation unit 25, the score calculation unit 26, the determination unit 27, the extraction unit 28, and the main body controller 29 is configured by a central processing unit (CPU) and a control program for causing the CPU to execute various kinds of processing, but the processor 31 may be configured by using a field programmable gate array (FPGA), a digital signal processor (DSP), an application specific integrated circuit (ASIC), a graphics processing unit (GPU), or other integrated circuits (IC) or may be configured by a combination thereof.

Further, the image generation unit 21, the display controller 22, the image feature calculation unit 25, the score calculation unit 26, the determination unit 27, the extraction unit 28, and the main body controller 29 of the processor 31 can also be configured by being integrated partially or entirely into one CPU or the like.

Next, the operation of the ultrasound diagnostic apparatus according to the first embodiment of the present invention will be described using the flowchart illustrated in FIG. 15.

First, in Step S1, in a state where the ultrasound probe 1 is in contact with the body surface of the subject by the user, the plurality of ultrasound images in which the lesion part M of the subject is imaged are acquired. In a case where the ultrasound image is acquired, the transmission and reception circuit 12 performs so-called reception focusing processing under the control of the main body controller 29 to generate sound ray signals. The sound ray signals generated by the transmission and reception circuit 12 are sent to the image generation unit 21. The image generation unit 21 generates the ultrasound image using the sound ray signals sent from the transmission and reception circuit 12. By repeating the processing, the plurality of consecutive ultrasound images are acquired. The plurality of acquired ultrasound images are sent to the image memory 24, and are stored in the image memory 24.

Next, in Step S2, the image feature calculation unit 25 analyzes the plurality of ultrasound images that are generated and stored in the image memory 24 in Step S1 to calculate the multidimensional image feature in each of the plurality of ultrasound images. For example, the image feature calculation unit 25 can calculate, as the multidimensional image feature, the intermediate numerical data that is output for each of the plurality of ultrasound images as the result of inputting the plurality of ultrasound images to the image recognition model such as a neural network in machine learning. Further, for example, the image feature calculation unit 25 can calculate an area ratio of a low brightness region with brightness lower than predetermined brightness to the entire region of the ultrasound image, a contrast ratio between an edge of the low brightness region and the surrounding region, and the like as the multidimensional image feature.

In Step S3, the score calculation unit 26 calculates the score of the lesion part M of the subject on the basis of the multidimensional image feature in the plurality of ultrasound images calculated in Step S2. The score calculation unit 26 can calculate a plurality of types of scores such as the benignancy or malignancy score, the category score, the shape score, and the border score, as the score of the lesion part M, for example. Further, for example, the score calculation unit 26 can calculate the score from the multidimensional image feature by using the machine learning model trained for the relationship between the multidimensional image feature and the score thereof.

In Step S4, the determination unit 27 performs the determination on the lesion part M on the basis of the score calculated for each of the plurality of ultrasound images in Step S3. For example, the determination unit 27 can output the shape of the lesion part M, the smoothness of the border portion of the lesion part M, the tissue type of the lesion part M, and the like, as the determination result. Further, the determination unit 27 sends the information on the ultrasound image corresponding to each determination result, to the extraction unit 28.

In Step S5, the extraction unit 28 extracts, as the basis image U, at least one ultrasound image best representing the determination result, from among the plurality of ultrasound images stored in the image memory 24 in Step S1, on the basis of the information on the ultrasound image corresponding to the determination result, which is sent from the determination unit 27 in Step S4.

Finally, in Step S6, the display controller 22 displays, on the monitor 23, a finding feature A5 and the like as the determination result of Step S4 and at least one basis image U best representing any one of the items of the finding feature A5 as illustrated in FIG. 12, for example. In this case, for example, in a case where the determination result indicated by the item in the finding feature A5 is selected by the user via the input device 30, the display controller 22 can display at least one basis image U best representing the selected determination result on the monitor 23. It is possible for the user to understand the basis for the selected determination result in more detail by checking the basis image U.

Figure 15:
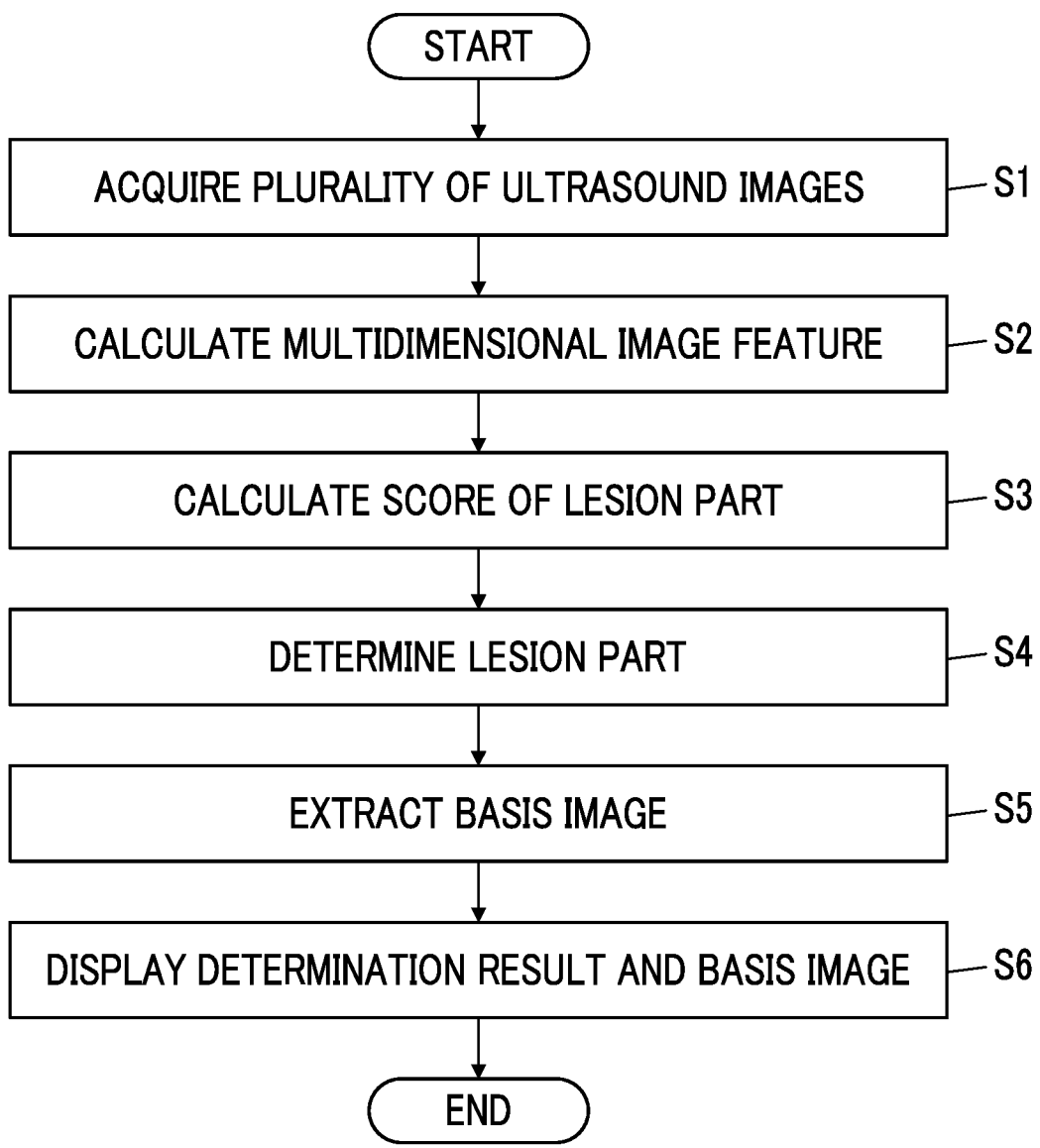
FIG. 15 is a flowchart illustrating an operation of an ultrasound diagnostic apparatus of the first embodiment.

In a case where the processing of Step S6 is completed in this manner, the operation of the ultrasound diagnostic apparatus illustrated in the flowchart of FIG. 15 is ended.

As described above, with the ultrasound diagnostic apparatus of the first embodiment of the present invention, the score calculation unit 26 calculates the score of the lesion part M on the basis of the multidimensional image feature calculated by the image feature calculation unit 25, the determination unit 27 performs the determination on the lesion part M on the basis of the score calculated by the score calculation unit 26, the extraction unit 28 extracts the ultrasound image best representing the determination result of the determination unit 27 from the plurality of ultrasound images, as the basis image U, and the determination result of the determination unit 27 and the basis image U extracted by the extraction unit 28 are displayed on the monitor 23. Therefore, it is possible for the user to understand the basis for the selected determination result in more detail, and to accurately perform the diagnosis for the lesion part M of the subject.

It has been described that the ultrasound probe 1 and the apparatus main body 2 are connected to each other in a wired manner, but the ultrasound probe 1 and the apparatus main body 2 can be connected to each other in a wireless manner.

The apparatus main body 2 may be a so-called stationary type, a portable type, or a handheld type configured by a so-called smartphone or tablet computer. As described above, the type of equipment constituting the apparatus main body 2 is not particularly limited.

Further, the transmission and reception circuit 12 is included in the ultrasound probe 1, but the transmission and reception circuit 12 may be included in the apparatus main body 2 instead of being included in the ultrasound probe 1.

Further, the image generation unit 21 is included in the apparatus main body 2, but the image generation unit 21 may be included in the ultrasound probe 1 instead of being included in the apparatus main body 2.

The ultrasound diagnostic apparatus of the first embodiment includes the ultrasound probe 1, but may not include the ultrasound probe 1. In this case, although not illustrated, the apparatus main body 2 can include, for example, an image input unit which is connected to a device such as an external ultrasound diagnostic apparatus, a server device, or a storage medium and to which the plurality of ultrasound images are input, instead of including the image generation unit 21. The plurality of ultrasound images input from the external device (not illustrated) to the image input unit are stored in the image memory 24. The processing by the image feature calculation unit 25, the score calculation unit 26, the determination unit 27, the extraction unit 28, and the display controller 22 is performed on the plurality of ultrasound images stored in this manner.

Second Embodiment

Figure 16:
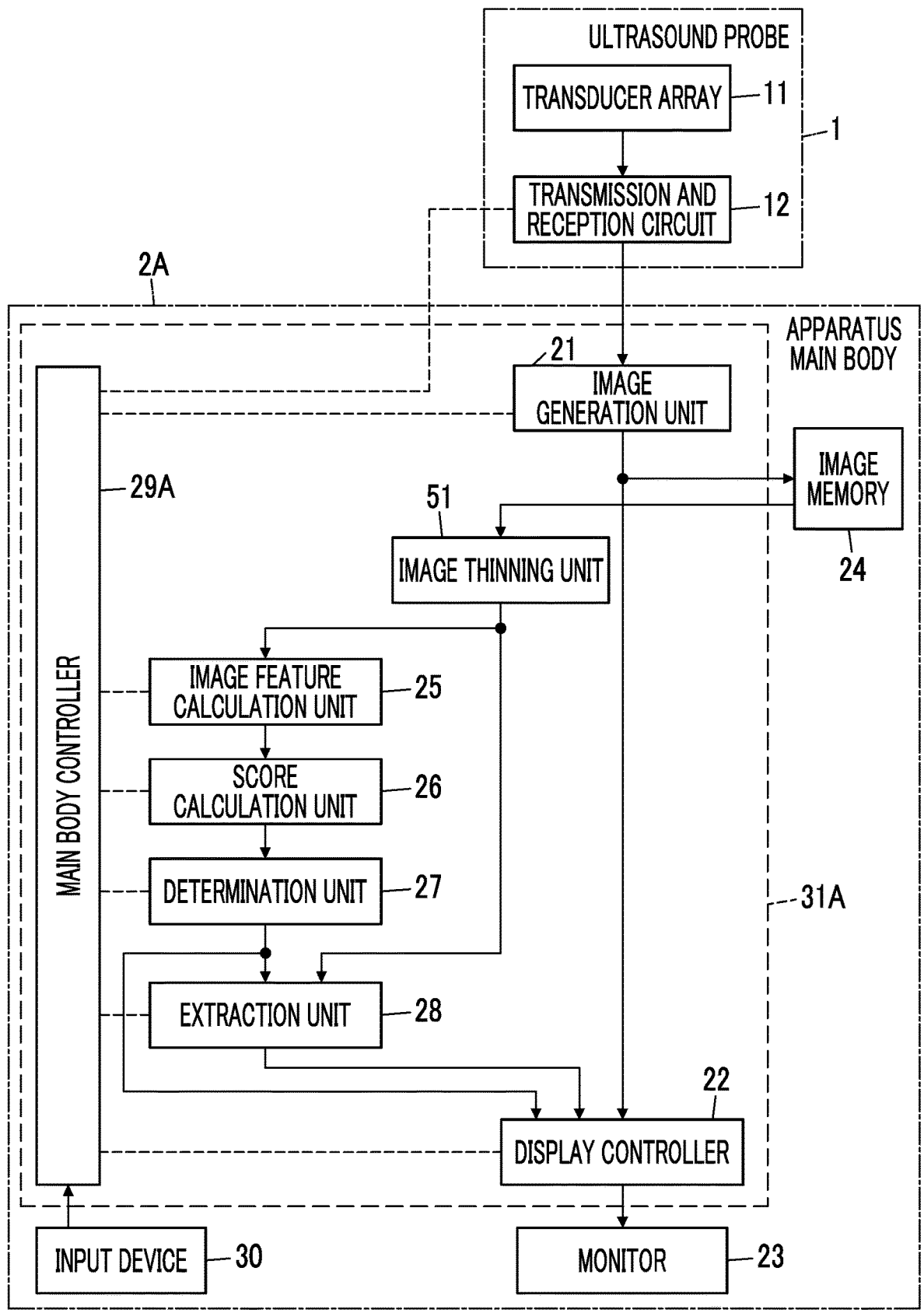
FIG. 16 is a block diagram illustrating a configuration of an ultrasound diagnostic apparatus of a second embodiment.

FIG. 16 illustrates an ultrasound diagnostic apparatus according to a second embodiment. The ultrasound diagnostic apparatus is obtained by including an apparatus main body 2A instead of the apparatus main body 2 in the ultrasound diagnostic apparatus illustrated in FIG. 1. The apparatus main body 2A is obtained by adding an image thinning unit 51 to the apparatus main body 2 illustrated in FIG. 1, and includes a main body controller 29A instead of the main body controller 29. Further, in the apparatus main body 2A, the image generation unit 21, the display controller 22, the image feature calculation unit 25, the score calculation unit 26, the determination unit 27, the extraction unit 28, the main body controller 29A, and the image thinning unit 51 constitute a processor 31A.

The image thinning unit 51 thins out the plurality of ultrasound images stored in the image memory 24. For example, the image thinning unit 51 can thin out the ultrasound image at a certain interval from the plurality of ultrasound images. Further, the image thinning unit 51 can perform the image analysis on the plurality of ultrasound images, perform processing of detecting the lesion part M in each of the plurality of ultrasound images, and thin out the ultrasound image from which the lesion part M has not been detected.

The multidimensional image feature is calculated by the image feature calculation unit 25 on the basis of the ultrasound images remaining after the image thinning unit 51 performs the thinning out processing in this manner. The score calculation unit 26 calculates the score of the lesion part M on the basis of the calculated multidimensional image feature, and the determination unit 27 determines the lesion part M on the basis of the calculated score of the lesion part M. Further, the extraction unit 28 extracts the basis image U best representing the determination result of the determination unit 27 from the ultrasound images remaining after the thinning out processing by the image thinning unit 51. The display controller 22 displays the determination result of the determination unit 27 and the basis image U extracted by the extraction unit 28 on the monitor 23.

In this manner, even in a case where a plurality of ultrasound images are thinned out by the image thinning unit 51, since the display controller 22 displays the determination result of the determination unit 27 and the basis image U extracted by the extraction unit 28 on the monitor 23, it is possible for the user to understand the basis for the selected determination result in more detail, and to accurately perform the diagnosis for the lesion part M of the subject.

Although not illustrated, the apparatus main body 2A can include an image interpolation unit that interpolates the plurality of ultrasound images stored in the image memory 24, instead of the image thinning unit 51. In this case, the number of ultrasound images used for calculating the multidimensional image feature by the image feature calculation unit 25 and the number of ultrasound images as the extract target of the extraction unit 28 are increased to be greater than the number of the plurality of ultrasound images stored in the image memory 24. However, since the display controller 22 displays the determination result of the determination unit 27 and the basis image U extracted by the extraction unit 28 on the monitor 23, it is possible for the user to understand the basis for the selected determination result in more detail, and to accurately perform the diagnosis for the lesion part M of the subject.

Although not illustrated, the apparatus main body 2A can include, instead of the image thinning unit 51, an image synthesizing unit that synthesizes the plurality of ultrasound images stored in the image memory 24 to generate a plurality of synthetic images. For example, the image synthesizing unit can synthesize ultrasound images that are temporally adjacent and similar to each other to generate a synthetic image with an improved image quality. The image feature calculation unit 25 performs the image analysis on a plurality of synthetic images, and calculates the multidimensional image feature from each of the plurality of synthetic images. Further, the extraction unit 28 extracts the synthetic image best representing the determination result of the determination unit 27 from the plurality of synthetic images, as the basis image U. In this manner, even in a case where a plurality of ultrasound images are synthesized, since the display controller 22 displays the determination result of the determination unit 27 and the basis image U extracted by the extraction unit 28 on the monitor 23, it is possible for the user to understand the basis for the selected determination result in more detail, and to accurately perform the diagnosis for the lesion part M of the subject.

Instead of the apparatus main body 2A including the image thinning unit 51, the image interpolation unit, or the image synthesizing unit, a plurality of thinned-out ultrasound images, a plurality of interpolated ultrasound images, or a plurality of synthesized ultrasound images can be stored in the image memory 24, and these ultrasound images can be used in the processing.

EXPLANATION OF REFERENCES

1: ultrasound probe
2, 2A: apparatus main body
11: transducer array
12: transmission and reception circuit
21: image generation unit
22: display controller
23: monitor
24: image memory
25: image feature calculation unit
26: score calculation unit
27: determination unit
28: extraction unit
29, 29A: main body controller
30: input device
31, 31A: processor
41: pulser
42: amplification unit
43: AD conversion unit
44: beam former
45: signal processing unit
46: DSC
47: image processing unit
51: image thinning unit
A1: finding feature
A2: estimated tissue type
A3: malignancy grade
A4: medical examination category
HM: heat map
L: enclosing line
M: lesion part
U: basis image

What is claimed is:

1. An ultrasound diagnostic apparatus that performs determination on a lesion part of a subject based on a plurality of ultrasound images in which the lesion part is imaged, the ultrasound diagnostic apparatus comprising:
    a monitor;
    a processor configured to
        calculate a multidimensional image feature in each of the plurality of ultrasound images by analyzing the plurality of ultrasound images,
        calculate a score of the lesion part in each of the plurality of ultrasound images based on the multidimensional image feature,
        perform determination on the lesion part based on the score calculated for each of the plurality of ultrasound images,
        extract the ultrasound image best representing a determination result on the lesion part from the plurality of ultrasound images, as a basis image, and
        display the determination result of the determination unit and the basis image on the monitor, wherein
    the plurality of ultrasound images are images forming a video in which the lesion part is imaged, and
    the processor is further configured to form a heat map in which a contribution rate of a portion contributing to calculation of the score is represented by color shading or color difference, in the basis image, and display the heat map on the monitor.

2. The ultrasound diagnostic apparatus according to claim 1, wherein each of the plurality of ultrasound images is an image in which an entire or a part of the lesion part is imaged.

3. The ultrasound diagnostic apparatus according to claim 2, wherein the processor is further configured to form an enclosing line surrounding the lesion part on the basis image, and superimpose and display the enclosing line on the basis image.

4. The ultrasound diagnostic apparatus according to claim 1, wherein the plurality of ultrasound images are a thinned-out image, an interpolated image, or a synthesized image from the images forming the video in which the lesion part is imaged.

5. The ultrasound diagnostic apparatus according to claim 1, wherein the processor is further configured to form an enclosing line surrounding the lesion part on the basis image, and superimpose and display the enclosing line on the basis image.

6. The ultrasound diagnostic apparatus according to claim 1, wherein the processor is further configured to calculate the score by a machine learning model trained for the multidimensional image feature of the ultrasound image.

7. The ultrasound diagnostic apparatus according to claim 1, wherein the processor is further configured to perform determination based on the score of the ultrasound image in which the imaged lesion part is the largest among the plurality of ultrasound images.

8. The ultrasound diagnostic apparatus according to claim 1, wherein the processor is further configured to perform determination based on the majority, the maximum value, the median, or the mode of the scores of the plurality of ultrasound images.

9. The ultrasound diagnostic apparatus according to claim 1, wherein the processor is further configured to exclude outliers from the scores of the plurality of ultrasound images, and perform determination based on the majority, the maximum value, the median, or the mode of the scores of the plurality of ultrasound images from which the outliers have been excluded.

10. A control method of an ultrasound diagnostic apparatus that performs determination on a lesion part of a subject based on a plurality of ultrasound images in which the lesion part is imaged, the control method comprising:

calculating a multidimensional image feature in each of the plurality of ultrasound images by analyzing the plurality of ultrasound images;

calculating a score of the lesion part in each of the plurality of ultrasound images based on the multidimensional image feature;

performing determination on the lesion part based on the score calculated for each of the plurality of ultrasound images;

extracting the ultrasound image best representing a determination result for the lesion part from the plurality of ultrasound images, as a basis image; and displaying the determination result and the basis image on a monitor, wherein the plurality of ultrasound images are images forming a video in which the lesion part is imaged, and the control method further comprises forming a heat map in which a contribution rate of a portion contributing to calculation of the score is represented by color shading or color difference, in the basis image, and displaying the heat map on the monitor.

* * * * *